US012785123B2

(12) United States Patent
Kim et al.

(10) Patent No.: US 12,785,123 B2
(45) Date of Patent: Nov. 3, 2026

(54) FUEL CELL VEHICLE AND METHOD OF CONTROLLING THE SAME

(71) Applicants: HYUNDAI MOTOR COMPANY, Seoul (KR); KIA CORPORATION, Seoul (KR)

(72) Inventors: Jae Ho Kim, Hwaseong-si (KR); Woo Young Lee, Hwaseong-si (KR); Yoon Tae Kim, Hwaseong-si (KR); Joo Seung Lee, Hwaseong-si (KR); Hyeon Ju Jeong, Hwaseong-si (KR); Sae Kwon Chang, Hwaseong-si (KR); Jong Jun Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/205,543

(22) Filed: May 12, 2025

(65) Prior Publication Data

US 2026/0100389 A1 Apr. 9, 2026

(30) Foreign Application Priority Data

Oct. 8, 2024 (KR) ........................ 10-2024-0136977

(51) Int. Cl.
*H01M 8/04858* (2016.01)
*B60L 50/40* (2019.01)
(Continued)

(52) U.S. Cl.
CPC ......... *H01M 8/04953* (2016.02); *B60L 50/40* (2019.02); *B60L 50/75* (2019.02); *B60L 58/40* (2019.02); *H01M 8/04559* (2013.01); *H01M 8/04589* (2013.01); *H01M 8/04649* (2013.01); *H01M 10/425* (2013.01); *H01M 16/006* (2013.01); *H02M 3/1584* (2013.01);
(Continued)

(58) Field of Classification Search
CPC ......... H01M 8/04953; H01M 8/04559; H01M 8/04589; H01M 8/04649; H01M 10/425; H01M 16/006; H01M 2008/1095; H01M 2220/20; H01M 2250/20; H01M 2250/402; B60L 50/40; B60L 50/75; B60L 58/40; H02M 3/1584
USPC .................................................. 307/9.1, 10.1
See application file for complete search history.

(56) References Cited

U.S. PATENT DOCUMENTS

| | | | | |
|---|---|---|---|---|
| 9,548,611 B2 | 1/2017 | Park et al. | | |
| 2004/0017198 A1 * | 1/2004 | Xie | H01M 8/249 | 324/416 |
| 2004/0033398 A1 * | 2/2004 | Kearl | H01M 8/04955 | 429/432 |

* cited by examiner

*Primary Examiner* — Arnold M Kinkead
(74) *Attorney, Agent, or Firm* — MCDONNELL BOEHNEN HULBERT & BERGHOFF LLP

(57) ABSTRACT

Disclosed are a fuel cell vehicle and a method of controlling the same. The fuel cell vehicle includes a battery, a cell stack configured to provide stack voltage, a load connected to the battery and the cell stack, a multiphase converter configured to adjust a voltage range between the cell stack and the battery and including first to $N^{th}$ (where N is a positive integer of 2 or greater) current paths connected to the cell stack and connected in parallel to each other, and a main controller configured to control the multiphase converter to allow alternating current to sequentially flow through the first to $N^{th}$ current paths when measurement of the impedance of the cell stack is required.

12 Claims, 5 Drawing Sheets

(51) Int. Cl.

| | |
|---|---|
| ***B60L 50/75*** | (2019.01) |
| ***B60L 58/40*** | (2019.01) |
| ***H01M 8/04537*** | (2016.01) |
| ***H01M 8/10*** | (2016.01) |
| ***H01M 10/42*** | (2006.01) |
| ***H01M 16/00*** | (2006.01) |
| ***H02M 3/158*** | (2006.01) |

(52) U.S. Cl.
CPC ............... *H01M 2008/1095* (2013.01); *H01M 2220/20* (2013.01); *H01M 2250/20* (2013.01); *H01M 2250/402* (2013.01)

FUEL CELL VEHICLE AND METHOD OF CONTROLLING THE SAME

CROSS REFERENCE TO RELATED APPLICATIONS

This application claims the benefit of Korean Patent Application No. 10-2024-0136977, filed on Oct. 8, 2024, which is hereby incorporated by reference as if fully set forth herein.

BACKGROUND

Field

Embodiments relate to a fuel cell vehicle and a method of controlling the same.

Discussion of the Related Art

Electrochemical Impedance Spectroscopy (EIS) may be applied to batteries and fuel cells. EIS is a technique used to measure the impedance of a fuel cell, providing real-time information about the operation and performance of the fuel cell based on the measured impedance. This allows the fuel cell to operate under optimal conditions, contributing to improved reliability and extended lifespan of the fuel cell. In the case of fuel cell systems, the impedance of a cell stack of a fuel cell may be used to determine the wet state of the cell stack, and appropriate humidification control may be performed based on a result of the determination, thereby improving the durability of the fuel cell.

In order to apply EIS, stack diagnosis is required to detect the impedance of the cell stack. This involves applying multiple harmonic alternating currents to the cell stack and measuring the alternating voltage and the alternating current of the cell stack. The impedance of the cell stack may be detected using the measured alternating voltage and alternating current. Various research on application of EIS is underway.

SUMMARY

Accordingly, embodiments are directed to a fuel cell vehicle and a method of controlling the same.

Embodiments provide a fuel cell vehicle having improved durability and a method of controlling the same.

However, the objects to be accomplished by the embodiments are not limited to the above-mentioned objects, and other objects not mentioned herein will be clearly understood by those skilled in the art from the following description.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

A fuel cell vehicle according to an embodiment may include a battery, a cell stack configured to provide stack voltage, a load connected to the battery and the cell stack, a multiphase converter configured to adjust a voltage range between the cell stack and the battery and including first to $N^{th}$ (where N is a positive integer of 2 or greater) current paths connected to the cell stack and connected in parallel to each other, and a main controller configured to control the multiphase converter to allow alternating current to sequentially flow through the first to $N^{th}$ current paths when measurement of the impedance of the cell stack is required.

In an example, the fuel cell vehicle may further include a voltage measurement unit disposed at an input terminal of the multiphase converter to measure alternating voltage of the cell stack and a current measurement unit disposed on the first to $N^{th}$ current paths to measure alternating current of the cell stack, and the main controller may measure the impedance using the alternating voltage and the alternating current.

In an example, the main controller may control the multiphase converter so that the alternating current is applied to each of the first to $N^{th}$ current paths during the predetermined same time period.

In an example, the multiphase converter may include an input capacitor connected between an output terminal of the cell stack and the input terminal of the multiphase converter, first to $N^{th}$ inductors connected in parallel to each other, each having an end connected between the output terminal of the cell stack and the input capacitor, first to $N^{th}$ diodes, each having a positive electrode connected to another end of a corresponding one of the first to $N^{th}$ inductors, first to $N^{th}$ semiconductor switches connected between nodes, between the first to $N^{th}$ inductors and the first to $N^{th}$ diodes, and a reference potential, and first to $N^{th}$ converter controllers configured to generate first to $N^{th}$ switching control signals to switch the first to $N^{th}$ semiconductor switches, respectively. The voltage measurement unit may be connected in parallel to the input capacitor, and each of the first to $N^{th}$ diodes may have a negative electrode connected to the battery and the load.

In an example, the multiphase converter may further include an alternating current selector configured to output the alternating current, provided from the main controller, to one converter controller selected from among the first to $N^{th}$ converter controllers in response to an alternating current control signal, and the main controller may generate the alternating current control signal in response to a result of comparing an alternating current application period, during which the alternating current is applied to an $n^{th}$ (where $1 \leq n \leq N$) converter controller, with an operation period threshold.

In an example, the $n^{th}$ (where $1 \leq n \leq N$) converter controller may include an adder configured to add the alternating current as an output from the alternating current selector to reference current and output a result of addition as a current control reference value, a subtractor configured to subtract current measured from the $n^{th}$ current path from the current control reference value, a proportional integrator configured to proportionally integrate an output from the subtractor and output a result of proportional integration, a limiter configured to limit the level of an output from the proportional integrator, and a comparator configured to compare an output from the limiter with reference voltage and output a result of comparison as an $n^{th}$ switching control signal.

In an example, the current measurement unit may include first to $N^{th}$ current meters connected between the first to $N^{th}$ inductors and the first to $N^{th}$ diodes.

According to another embodiment, a method of controlling a fuel cell vehicle including a battery, a cell stack configured to provide stack voltage, a load connected to the battery and the cell stack, and a multiphase converter configured to adjust a voltage range between the cell stack and the battery and including first to $N^{th}$ (where N is a positive integer of 2 or greater) current paths connected to the cell stack and connected in parallel to each other may include providing alternating current for measurement of the impedance of the cell stack to the multiphase converter when operation of the multiphase converter is required and controlling the multiphase converter to allow alternating current to sequentially flow through the first to $N^{th}$ current paths of the multiphase converter when measurement of the impedance of the cell stack is required.

In an example, the method may further include measuring alternating voltage applied to an input terminal of the multiphase converter, measuring the alternating current flowing through one of the first to $N^{th}$ current paths, and obtaining the impedance using the alternating current and the alternating voltage.

In an example, controlling the multiphase converter may include applying the alternating current to an $n^{th}$ (where $1 \leq n \leq N$) current path when measurement of the impedance is required, applying the alternating current to current paths other than the $n^{th}$ current path when an alternating current application period during which the alternating current is applied to the $n^{th}$ current path is greater than or equal to an operation period threshold, and measuring the alternating voltage and the alternating current when the alternating current application period during which the alternating current is applied to the $n^{th}$ current path is less than the operation period threshold.

In an example, the operation period threshold may be set in advance in accordance with the durability of switching semiconductor devices located on the first to $N^{th}$ current paths in the multiphase converter.

It is to be understood that both the foregoing general description and the following detailed description of the present disclosure are exemplary and explanatory and are intended to provide further explanation of the disclosure as claimed.

BRIEF DESCRIPTION OF THE FIGURES

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above", and "under/lower part/below", are used only to distinguish between one subject or element and another subject or element, without necessarily requiring or involving any physical or logical relationship or sequence between the subjects or elements.

Hereinafter, a fuel cell vehicle 100 according to an embodiment will be described with reference to the accompanying drawings.

Figure 1:
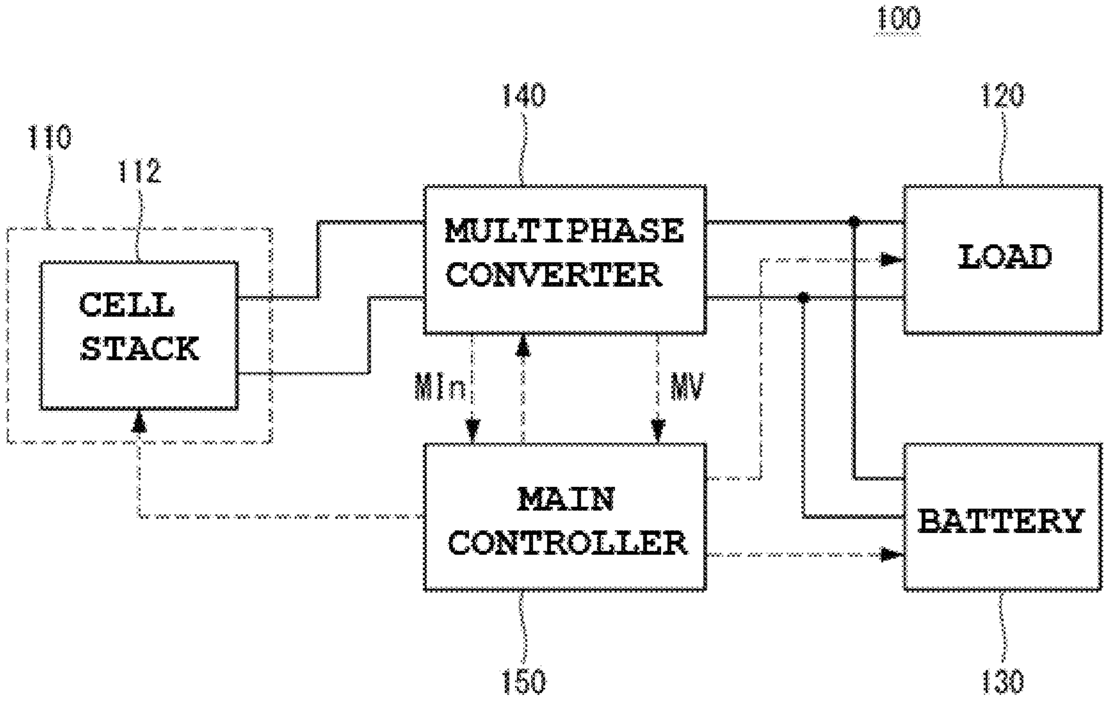
FIG. 1 is a block diagram of a fuel cell vehicle according to an embodiment.

FIG. 1 is a block diagram of a fuel cell vehicle 100 according to an embodiment. The fuel cell vehicle 100 may include a fuel cell 110, a load 120, a battery (or high-voltage battery) 130, a multiphase converter (multiphase voltage level converter or multiphase boost converter) 140, and a main controller 150. Here, solid lines represent paths along which power is supplied, and dotted lines represent paths along which control signals are transmitted.

The fuel cell 110 may include a plurality of unit fuel cells stacked in at least one of a vertical direction or a horizontal direction. The unit fuel cell may be a polymer electrolyte membrane fuel cell (or proton exchange membrane fuel cell) (PEMFC), which has been studied most extensively as a power source for driving fuel cell vehicles. However, the embodiments are not limited to any specific form, configuration, or appearance of the unit fuel cell.

The unit fuel cell included in the fuel cell 110 may include end plates (pressing plates or compression plates) (not shown), current collectors (not shown), and a cell stack 112.

The cell stack 112 may include a plurality of unit cells stacked in the horizontal direction. Tens to hundreds of unit cells, for example, 100 to 400 unit cells, may be stacked to form the cell stack 112. The number of unit fuel cells included in the fuel cell 110 and the number of unit cells included in the cell stack 112 of the unit fuel cell may be determined depending on the intensity of power to be supplied from the fuel cell 110 to the load 120.

Here, the load 120 refers to a component that requires power in the fuel cell vehicle 100. The load 120 may be connected to the battery 130 and the cell stack 112 and may receive power from the cell stack 112 or the battery 130. The load 120 may include an inverter (not shown) and a motor (not shown). The inverter may convert DC voltage received from the multiphase converter 140 into AC voltage in accordance with the operational state of the fuel cell vehicle 100, and may output the AC voltage to the motor. The motor may operate in response to the AC voltage output from the inverter. In other words, the motor may rotate in response to the AC voltage for the motor received from the inverter, thereby performing the function of driving the fuel cell vehicle 100. For example, the motor may be a three-phase alternating current (AC) rotating device that includes a rotor embedded with permanent magnets. However, the embodiments are not limited to any specific form of the main output unit, the inverter, or the motor.

In addition, although not shown in the drawings, the fuel cell vehicle 100 may further include peripheral auxiliary devices (balance-of-plant (BOP)) and high-voltage components.

The end plates may be disposed at respective ends of the cell stack 112 and may support and fix the plurality of unit cells. That is, the first end plate may be disposed at one of the two opposite ends of the cell stack 112, and the second end plate may be disposed at the other of the two opposite ends of the cell stack 112.

In addition, the fuel cell 110 may further include a clamping member (not shown), which has a bar shape, a long bolt shape, a belt shape, or a rigid rope shape to clamp the plurality of unit cells. For example, in each unit fuel cell, the clamping member serves to clamp the plurality of unit cells in the horizontal direction together with the end plates.

The multiphase converter 140 may boost the stack voltage generated by the cell stack 112 of the fuel cell 110 and may output the boosted voltage to the battery 130 or the load 120. For example, the multiphase converter 140 may include a high-voltage boost DC/DC converter (or a fuel cell DC/DC converter (FDC)).

Generally, the FDC performs the operation of matching the stack voltage generated by the fuel cell 110 with the voltage stored in the battery 130. That is, the multiphase converter 140 may adjust the voltage range between the cell stack 112 and the battery 130. For example, while the level of the stack voltage is about 100 V to about 200 V, the voltage level of the battery 130 is about 600 V. Thus, the FDC may operate as a type of boost converter that steps up the stack voltage to 600 V.

The battery 130 stores the boosted voltage output from the multiphase converter 140.

The main controller 170 serves to control the operation of the multiphase converter 140, which will be described later.

Figure 2:
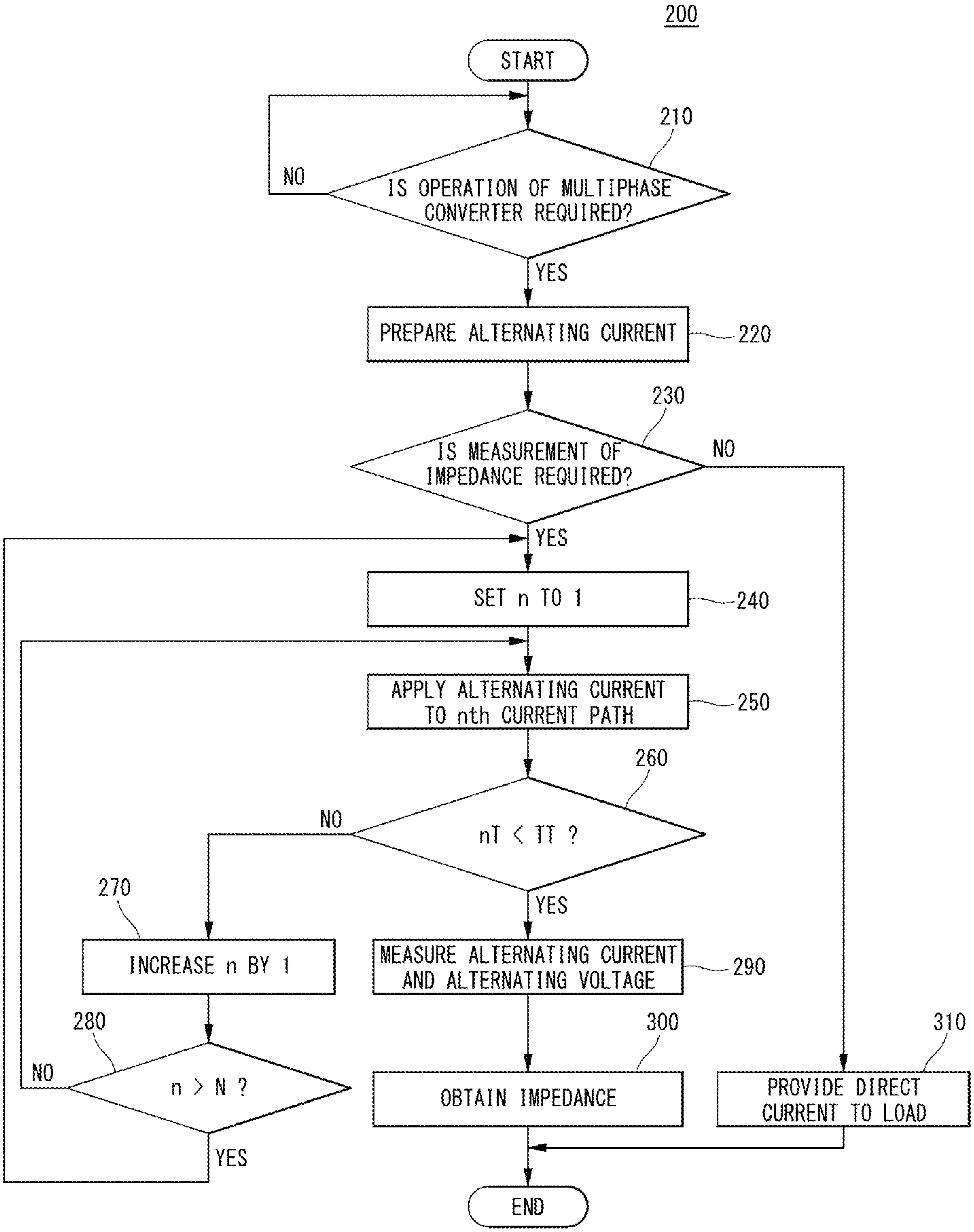
FIG. 2 is a flowchart showing a method of controlling the fuel cell vehicle according to an embodiment.

FIG. 2 is a flowchart showing a method 200 of controlling the fuel cell vehicle according to an embodiment.

Figure 3:
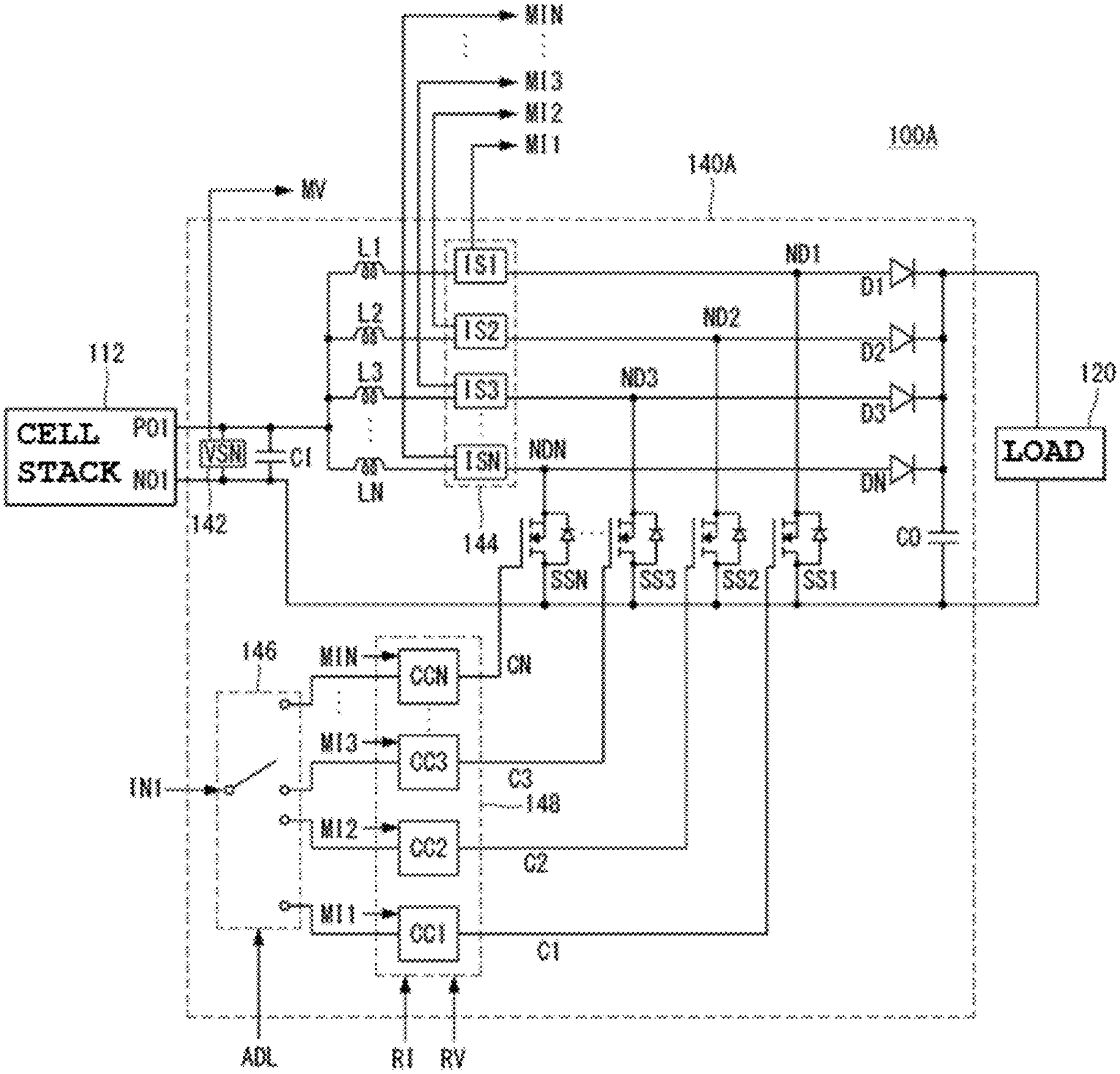
FIG. 3 is a circuit diagram of an embodiment of the fuel cell vehicle shown in FIG. 1.

FIG. 3 is a circuit diagram of an embodiment 100A of the fuel cell vehicle 100 shown in FIG. 1.

Hereinafter, although the method 200 shown in FIG. 2 will be described as being performed by the fuel cell vehicles 100 and 100A shown in FIGS. 1 and 3 and the fuel cell vehicles 100 and 100A shown in FIGS. 1 and 3 will be described as performing the method 200 shown in FIG. 2, the embodiments are not limited thereto. That is, the method shown in FIG. 2 may also be performed by a fuel cell vehicle configured differently from the fuel cell vehicles 100 and 100A shown in FIGS. 1 and 3.

The fuel cell vehicle 100A shown in FIG. 3 may include a cell stack 112, a multiphase converter 140A, and a load 120 such as those in FIG. 1. Illustration of the battery 130 and the main controller 150 shown in FIG. 1 is omitted in FIG. 3.

Before explaining the method 200 shown in FIG. 2, an embodiment 140A of the multiphase converter 140 shown in FIG. 1 will be described with reference to FIG. 3.

The multiphase converter 140 shown in FIG. 1 may include first to $N^{th}$ current paths connected to the cell stack 112 and connected in parallel to each other. Here, N is a positive integer of 2 or greater. One current path corresponds to one phase. Because a plurality of current paths is provided, the converter including the same is referred to as a multiphase converter.

The multiphase converter 140A shown in FIG. 3 may include an input capacitor CI, an output capacitor CO, first to $N^{th}$ inductors L1 to LN, first to $N^{th}$ diodes D1 to DN, and first to $N^{th}$ semiconductor switches SS1 to SSN. According to the embodiment, the multiphase converter 140A may further include first to $N^{th}$ converter controllers 148 (CC1 to CCN) and an alternating current selector 146.

In addition, the multiphase converter 140A may be provided with a voltage measurement unit 142 and a current measurement unit 144.

The input capacitor CI is connected between an output terminal of the cell stack 112 and an input terminal of the multiphase converter 140A. That is, the input capacitor CI may be connected between a positive output terminal POI of the cell stack 112 and a negative output terminal NO1 of the cell stack 112.

Each of the first to $N^{th}$ inductors L1 to LN has an end connected between the output terminal of the cell stack 112 and the input capacitor CI, i.e., connected to the positive output terminal POI of the cell stack 112, and another end connected to a positive electrode of a corresponding one of the first to $N^{th}$ diodes D1 to DN. That is, the $n^{th}$ inductor Ln has an end connected to the positive output terminal POI of the cell stack 112 and another end connected to the positive electrode of the $n^{th}$ diode Dn, where $1 \leq n \leq N$.

Further, the first to $N^{th}$ inductors L1 to LN are connected in parallel to each other.

Because each inductor forms one current path, the multiphase converter 140A shown in FIG. 3 has N current paths. Here, the first inductor L1 forms a first current path, the second inductor L2 forms a second current path, the third inductor L3 forms a third current path, and the $N^{th}$ inductor LN forms an $N^{th}$ current path.

In addition, each of the first to $N^{th}$ diodes D1 to DN has a positive electrode connected to the other end of a corresponding one of the first to $N^{th}$ inductors L1 to LN and a negative electrode connected to the output capacitor CO. That is, the $n^{th}$ diode Dn has a positive electrode connected to the other end of the $n^{th}$ inductor Ln and a negative electrode connected to the output capacitor CO. Although not shown in FIG. 3, the negative electrodes of the first to $N^{th}$ diodes D1 to DN may be connected not only to the load 120 but also to the battery 130.

The first to $N^{th}$ semiconductor switches SS1 to SSN may be connected between nodes ND1 to NDN, between the first to $N^{th}$ inductors L1 to LN and the first to $N^{th}$ diodes D1 to DN, and a reference potential. Here, the reference potential may be the negative output terminal NO1 of the cell stack 112. That is, the $n^{th}$ semiconductor switch SSn may be connected between a node NDn, between the $n^{th}$ inductor Ln and the $n^{th}$ diode Dn, and the reference potential.

For example, each SSn of the first to $N^{th}$ semiconductor switches SS1 to SSN may switch on (or turn on) or switch off (or turn off) in response to an $n^{th}$ switching control signal Cn, and may be connected between the other end of the $n^{th}$ inductor Ln and the negative output terminal NO1 of the cell stack 110. The $n^{th}$ semiconductor switch SSn may have a gate connected to the $n^{th}$ switching control signal Cn, a drain connected to the other end of the $n^{th}$ inductor Ln, and a source connected to the negative output terminal NO1.

Each of the first to $N^{th}$ semiconductor switches SS1 to SSN may be implemented as an insulated gate bipolar transistor (IGBT) or a field effect transistor (FET). For example, each of the first to $N^{th}$ semiconductor switches SS1 to SSN may be implemented as a transistor, as shown in FIG. 3.

The output capacitor CO may be connected between the negative electrode of each of the first to $N^{th}$ diodes D1 to DN and the reference potential.

The first to $N^{th}$ converter controllers CC1 to CCN generate first to $N^{th}$ switching control signals C1 to CN to switch the first to $N^{th}$ semiconductor switches SS1 to SSN, respectively. That is, the $n^{th}$ converter controller CCn generates an $n^{th}$ switching control signal Cn to switch the $n^{th}$ semiconductor switch SSn.

Figure 4:
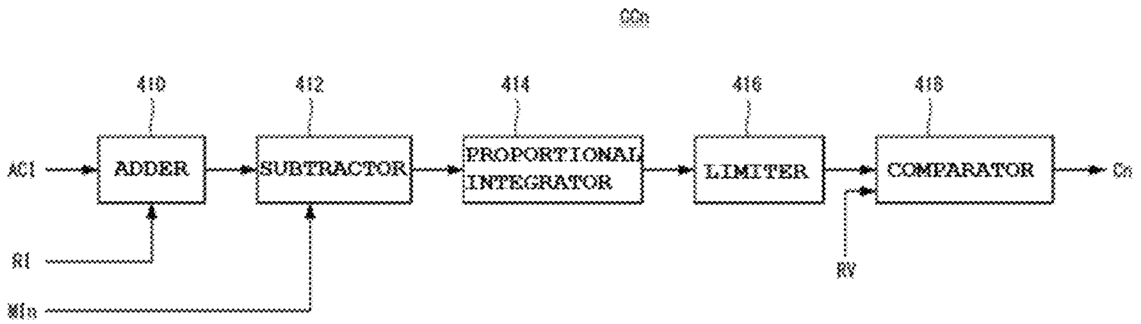
FIG. 4 is a block diagram of an embodiment of an $n^{th}$ converter controller shown in FIG. 3.

FIG. 4 is a block diagram of an embodiment of the $n^{th}$ converter controller CCn shown in FIG. 3, and FIGS. 5A to 5C are waveform diagrams of various currents.

The $n^{th}$ converter controller CCn shown in FIG. 4 may include an adder 410, a subtractor 412, a proportional integrator (PI) 414, a limiter 416, and a comparator 418.

Figure 5A:
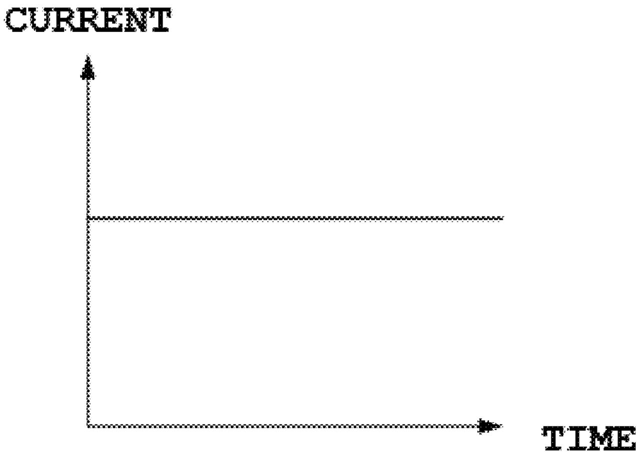
FIG. 5A is a waveform diagram of a current.
Figure 5B:
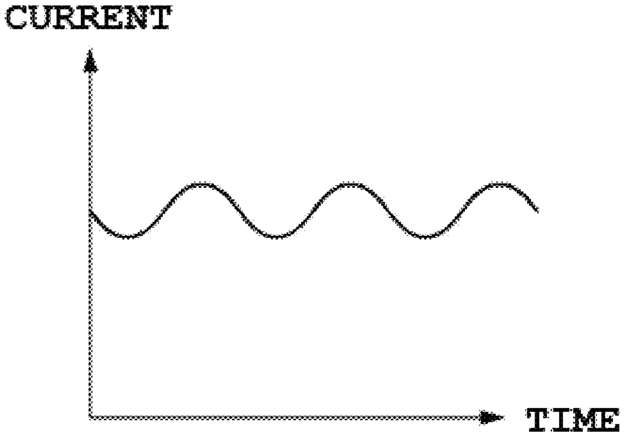
FIG. 5B is a waveform diagram of a current.
Figure 5C:
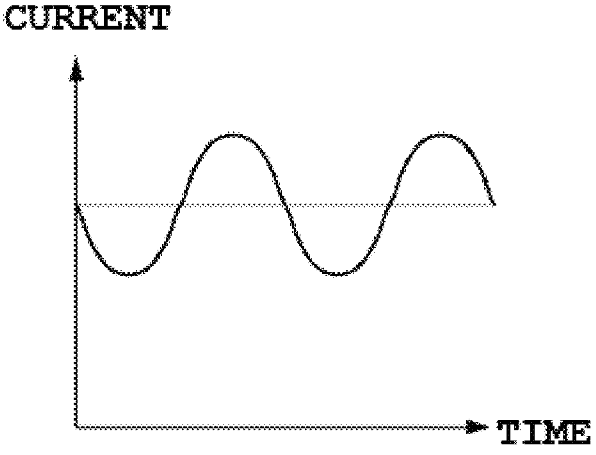
FIG. 5C is a waveform diagram of a current.

The adder 410 may add alternating current ACI shown in FIG. 5B, which is the output from the alternating current selector 146, to reference current RI shown in FIG. 5A, and may output a result of the addition, which is shown in FIG. 5C, as a current control reference value to the subtractor 412. However, when the alternating current ACI is not selected by the alternating current selector 146, the adder 410 may output only the reference current RI, which is direct current, to the subtractor 412.

The subtractor 412 subtracts current Min, measured from the $n^{th}$ current path, from the current control reference value, which is the output from the adder 410, and outputs a result of the subtraction to the proportional integrator 414.

The proportional integrator 414 proportionally integrates the output from the subtractor 412, and outputs a result of the proportional integration.

The limiter 416 limits the level of the output from the proportional integrator 414, and outputs a result of the limiting. The limiter 416 may perform not only the function of limiting the level but also the function of eliminating disturbances.

The comparator 418 compares the output from the limiter 416 with reference voltage VR, and outputs a result of the comparison as the $n^{th}$ switching control signal Cn. The $n^{th}$ switching control signal Cn output from the comparator 418 may be in the form of pulse width modulation (PWM).

In addition, the alternating current selector 146 receives alternating current provided by the main controller 150 through an input terminal IN1, and provides the alternating current to one converter controller selected from among the first to $N^{th}$ converter controllers CC1 to CCN in response to an AC control signal ADC.

According to the embodiment, when the main controller 150 intends to measure the impedance of the cell stack 112, the main controller 150 may control the multiphase converter 140 or 140A to allow alternating current to sequentially flow through the first to $N^{th}$ current paths. The main controller 150 may control the multiphase converter 140 or 140A so that alternating current is applied to each of the first to $N^{th}$ current paths during the predetermined same time period. To this end, the main controller 150 may compare the time period during which alternating current is applied to the $n^{th}$ converter controller CCn (hereinafter referred to as a "current application period") with an operation period threshold, and may generate an AC control signal ADC based on a result of the comparison.

The detailed operation in which the main controller 150 controls the multiphase converter 140 or 140A through the AC control signal ADC so that alternating current sequentially flows through the first to $N^{th}$ current paths will be described later with reference to FIG. 2.

The voltage measurement unit VSN may be disposed at the input terminal of the multiphase converter 140A to measure the AC voltage of the cell stack 112 and output the measured AC voltage MV to the main controller 150. To this end, the voltage measurement unit VSN may be connected in parallel to the input capacitor CI.

The current measurement unit 144 may be disposed on the first to $N^{th}$ current paths to measure the alternating current of the cell stack 112 and output the measured alternating currents MII to MIN to the main controller 150. According to the embodiment, the current measurement unit 144 may include first to $N^{th}$ current meters IS1 to ISN. The first to $N^{th}$ current meters IS1 to ISN may connected between the first to $N^{th}$ inductors L1 to LN and the first to $N^{th}$ diodes D1 to DN, respectively. That is, the first to $N^{th}$ current meters IS1 to ISN may be disposed on the first to $N^{th}$ current paths, respectively.

As described above, because the main controller 150 controls the multiphase converter 140A to allow alternating current to sequentially flow through the first to $N^{th}$ current paths, the alternating current may be measured by only one ISn of the first to $N^{th}$ current meters IS1 to ISN, and the measured alternating current ISn may be provided to the main controller 150.

The main controller 150 may measure impedance using the alternating voltage MV and the alternating current MIn, as shown in Equation 1 below.

$$Z = MV \times MIn \quad \text{[Equation 1]}$$

Here, Z represents the impedance.

Hereinafter, the method 200 of controlling the fuel cell vehicle according to the embodiment will be described with reference to FIG. 2. The method 200 shown in FIG. 2 may be performed by the main controller 150.

First, the decision whether to operate the multiphase converter 140 or 140A is determined (step 210). If it is determined that operation of the multiphase converter 140 or 140A is required, alternating current for measurement of the impedance of the cell stack 112 is prepared and supplied to the multiphase converter 140 or 140A (step 220). Information corresponding to the alternating current, such as the amplitude, peak-to-peak level, and period of the alternating current, may be provided from the main controller 150 to the multiphase converter 140 or 140A. That is, the information corresponding to the alternating current may be supplied as the alternating current to the input terminal IN1 of the alternating current selector 146 shown in FIG. 3.

After step 220, whether measurement of the impedance of the cell stack 112 is required is determined (step 230). Step 230 may be performed during driving of the fuel cell vehicle.

If measurement of the impedance is not required, direct current is supplied to the load (step 310). In this case, the main controller 150 controls the alternating current selector 146 using an AC control signal ADC to prevent the alternating current input through the input terminal IN1 from being supplied to any of the first to $N^{th}$ converter controllers CC1 to CCN from the alternating current selector 146. Therefore, only the direct current, not including the alternating current, is output as a current control reference value from the adder 410 of each of the first to $N^{th}$ converter controllers CC1 to CCN to the subtractor 412. Consequently, the direct current shown in FIG. 5A, which flows through each of the first to $N^{th}$ current paths, may be completely supplied to the load 120.

However, if measurement of the impedance of the cell stack 112 is required, the multiphase converter 140A is controlled such that the alternating current sequentially flows through the first to $N^{th}$ current paths of the multiphase converter 140A (steps 240 to 280).

First, if measurement of the impedance of the cell stack 112 is required, n is set to 1 (step 240).

After step 240, alternating current is applied to the $n^{th}$ current path (step 250). For example, in response to the AC control signal ADC generated by the main controller 150, the alternating current selector 146 outputs the alternating current input through the input terminal IN1 to the $n^{th}$ converter controller CCn. Thus, while both the alternating current and the direct current shown in FIG. 5C flow through the $n^{th}$ current path, only the direct current shown in FIG. 5A flows through the current paths except the $n^{th}$ current path among the first to $N^{th}$ current paths. This is because the alternating current is supplied only to the $n^{th}$ converter controller CCn from the alternating current selector 146.

After step 250, whether the AC application period nT during which alternating current is applied to the $n^{th}$ current path is less than the operation period threshold TT is determined (step 260).

According to the embodiment, because the durability ensured for each of the semiconductor switches SS1 to SSN is different from that of another, the operation period threshold TT may be set in advance based on the endurance period verified through initial experiments in accordance with the durability of the semiconductor switches SS1 to SSN connected to the first to $N^{th}$ current paths in the multiphase converter 140A.

By performing step 260, the periods during which the alternating current is applied to the first to $N^{th}$ current paths may be equalized, and accordingly, the durability of the semiconductor switches SS1 to SSN may be improved.

If the AC application period nT is greater than or equal to the operation period threshold TT, alternating current is applied to current paths other than the $n^{th}$ current path. That is, if the AC application period nT is greater than or equal to the operation period threshold TT, n is increased by 1 (step 270). After step 270, whether n is greater than N is determined (step 280). If n is greater than N, n is reset to 1 (step 240). However, if n is not greater than N, alternating current is applied to the $n^{th}$ current path, with n increased by 1 (step 250).

In order to aid in understanding the embodiment, steps 240 to 280 shown in FIG. 2 will be described on the assumption that N is 3 (N=3).

First, if measurement of the impedance of the cell stack 112 is required, n is set to 1 (step 240).

After step 240, alternating current is applied to the first current path (step 250). For example, in response to the AC control signal ADC generated by the main controller 150, the alternating current selector 146 outputs the alternating current input through the input terminal IN1 to the first converter controller CC1. Thus, while both the alternating current and the direct current shown in FIG. 5C flow through the first current path, only the direct current shown in FIG. 5A flows through the second and third current paths.

After step 250, whether the AC application period nT during which alternating current is applied to the first current path is less than the operation period threshold TT is determined (step 260).

If the AC application period nT is greater than or equal to the operation period threshold TT, n (=1) is increased by 1 (step 270). Thus, n becomes 2. After step 270, whether n is greater than N is determined (step 280). In this case, because 2 is not greater than 3, alternating current is applied to the second current path (step 250).

After step 250, whether the AC application period nT during which alternating current is applied to the second current path is less than the operation period threshold TT is determined (step 260). If the AC application period nT is greater than or equal to the operation period threshold TT, n (=2) is increased by 1 (step 270). Thus, n becomes 3. After step 270, whether n is greater than N is determined (step 280). In this case, because 3 is not greater than 3, alternating current is applied to the third current path (step 250).

After step 250, whether the AC application period nT during which alternating current is applied to the third current path is less than the operation period threshold TT is determined (step 260). If the AC application period nT is greater than or equal to the operation period threshold TT, n (=3) is increased by 1 (step 270). Thus, n becomes 4. After step 270, whether n is greater than N is determined (step 280). In this case, because 4 is greater than 3, n is reset to 1 (step 240). Thereafter, the above-described operation in which alternating current is sequentially applied to the first to third current paths is repeated.

If the AC application period nT is less than the operation period threshold TT, the alternating voltage applied to the input terminal of the multiphase converter 140A is measured, and the alternating current flowing through one of the first to $N^{th}$ current paths is measured (step 290). Step 290 may be performed by the voltage measurement unit 142 and the current measurement unit 144. That is, the voltage measurement unit 142 measures the voltage across both ends of the input capacitor CI, and provides the measured alternating voltage MV to the main controller 150. In the current measurement unit 144, the $n^{th}$ current meter ISn measures the alternating current flowing through the $n^{th}$ current path, and provides the measured alternating current MIn to the main controller 150.

After step 290, impedance is obtained using the alternating current MIn and the alternating voltage MV, as shown in Equation 1 above (step 300).

Hereinafter, a fuel cell apparatus according to a comparative example and the fuel cell vehicle according to the embodiment will be compared with each other.

The fuel cell apparatus according to the comparative example is disclosed in U.S. Pat. Registration No. 9,548,611 (entitled "METHOD FOR GENERATING INJECTED CURRENT OF FUEL CELL STACK AND APPARATUS PERFORMING THE SAME" and registered on Jan. 17, 2017).

The comparative example discloses a method of generating injected current of a fuel cell stack performed in an apparatus for generating injected current of a fuel cell stack. In detail, according to the comparative example, the method includes extracting a first frequency current and a second frequency current by passing alternating currents of different frequencies through a plurality of filters, generating a summed frequency current by summing the first frequency current and the second frequency current, and applying the summed frequency current to the fuel cell stack. In this way, the summed current obtained by summing the alternating current for calculating the total harmonic distortion (THD) and the alternating current for calculating the impedance is applied to the fuel cell stack.

However, in the case of the comparative example, in order to generate alternating currents of different frequencies, a plurality of AC generator is provided corresponding to the plurality of frequencies, which makes the configuration of the system complicated and causes increase in manufacturing costs. Therefore, there is a need to solve this problem.

In contrast, according to the embodiment, the multiphase converter 140 or 140A, which is essential for adjustment of the voltage range between the cell stack 112 and the battery 130, may generate alternating current required for measurement of the impedance of the cell stack 112 without an additional circuit by changing the current control reference value (corresponding to the output from the adder 410 shown in FIG. 4). That is, according to the embodiment, it is possible to generate alternating currents of a plurality of frequencies for calculating the total harmonic distortion (THD) and the impedance of the cell stack 112 without adding AC generators, unlike the comparative example.

The alternating current has a very small absolute value compared to the load direct current flowing from the multiphase converter 140 or 140A to the load 120. Therefore, even when alternating current flows through only one current path within the multiphase converter 140 or 140A, the impedance of the cell stack may be calculated using the alternating current and the alternating voltage together. That is, if current obtained by adding the alternating current to the direct current supplied to the load 120 is applied to one of the N current paths, the alternating current flows through the inductor disposed on the corresponding current path, thereby implementing measurement of the impedance.

In this case, if current obtained by adding the alternating current to the direct current flowing to the load 120 is applied to only one of the N current paths, the root mean square (RMS) of the current increases, and the temperature of the semiconductor switch connected to the corresponding current path increases. As a result, the durability of the semiconductor switch deteriorates. That is, if alternating current is applied to only one current path in the fuel cell vehicle, the current path to which the alternating current is applied is reduced in lifespan compared to the other current paths to which the alternating current is not applied, but through which only the direct current flows. As a result, the overall durability of the multiphase converter may deteriorate.

Therefore, according to the embodiment, alternating current may be sequentially applied to the first to $N^{th}$ current paths of the multiphase converter 140 or 140A while equalizing the time periods during which the alternating current is applied to the respective current paths. Accordingly, it is possible to improve the durability of the semiconductor switches SS1 to SSN in the multiphase converter 140 or 140A and to allow the multiphase converter 140 or 140A to operate at the optimum operating point while implementing measurement of the impedance of the cell stack 112.

As is apparent from the above description, according to a fuel cell vehicle and a method of controlling the same according to the embodiments, it is possible to generate alternating current required for measurement of the impedance of a cell stack without an additional circuit, to improve the durability of semiconductor switches in a multiphase converter, and to allow the multiphase converter to operate at the optimum operating point while implementing measurement of the impedance of the cell stack.

However, the effects achievable through the disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

The invention claimed is:

1. A fuel cell vehicle, comprising:

a battery;

a cell stack configured to provide stack voltage;

a load connected to the battery and the cell stack;

a multiphase converter configured to adjust a voltage range between the cell stack and the battery, the multiphase converter including a first current path to an $N^{th}$ current path, wherein Nis a positive integer of 2 or greater, connected to the cell stack and connected in parallel to each other; and a main controller configured to control the multiphase converter to allow alternating current to sequentially flow through the first to the $N^{th}$ current paths when measurement of an impedance of the cell stack is required, wherein the main controller controls the multiphase converter so that the alternating current flows at each of the first to $N^{th}$ current paths during a predetermined same time period.

2. The fuel cell vehicle according to claim 1, further comprising:

a voltage measurement unit disposed at an input terminal of the multiphase converter, the voltage measurement unit being configured to measure alternating voltage of the cell stack; and a current measurement unit disposed on the first to $N^{th}$ current paths, the current measurement unit being configured to measure alternating current of the cell stack, wherein the main controller measures the impedance using the alternating voltage and the alternating current.

3. The fuel cell vehicle according to claim 1, wherein the multiphase converter includes:

an input capacitor connected between an output terminal of the cell stack and the input terminal of the multiphase converter;

first to $N^{th}$ inductors connected in parallel to each other, each having an end connected between the output terminal of the cell stack and the input capacitor;

first to $N^{th}$ diodes, each having a positive electrode connected to another end of a corresponding one of the first to $N^{th}$ inductors;

first to $N^{th}$ semiconductor switches connected between nodes, which are positioned between the first to $N^{th}$ inductors and the first to $N^{th}$ diodes, and a reference potential; and first to $N^{th}$ converter controllers configured to generate first to $N^{th}$ switching control signals to switch the first to $N^{th}$ semiconductor switches, respectively, wherein the voltage measurement unit is connected in parallel to the input capacitor, and wherein each of the first to $N^{th}$ diodes has a negative electrode connected to the battery and the load.

4. The fuel cell vehicle according to claim 3, wherein the multiphase converter further includes an alternating current selector configured to output the alternating current, provided from the main controller, to one converter controller selected from among the first to $N^{th}$ converter controllers in response to an alternating current control signal, and wherein the main controller generates the alternating current control signal in response to a result of comparing an alternating current application period, during which the alternating current is applied to an $n^{th}$ (where $1 \le n \le N$) converter controller, with an operation period threshold.

5. The fuel cell vehicle according to claim 4, wherein the $n^{th}$ (where $1 \le n \le N$) converter controller includes:

an adder configured to add the alternating current as an output from the alternating current selector to reference current and output a result of the addition as a current control reference value;

a subtractor configured to subtract current measured from the $n^{th}$ current path from the current control reference value;

a proportional integrator configured to proportionally integrate an output from the subtractor and output a result of proportional integration;

a limiter configured to limit a level of an output from the proportional integrator; and a comparator configured to compare an output from the limiter with reference voltage and output a result of comparison as an $n^{th}$ switching control signal.

6. The fuel cell vehicle according to claim 3, wherein the current measurement unit includes first to $N^{th}$ current meters connected between the first to $N^{th}$ inductors and the first to $N^{th}$ diodes.

7. A method of controlling a fuel cell vehicle comprising a battery, a cell stack configured to provide stack voltage, a load connected to the battery and the cell stack, and a multiphase converter configured to adjust a voltage range between the cell stack and the battery, the multiphase converter including a first current path to an $N^{th}$ current path, wherein N is a positive integer of 2 or greater, connected to the cell stack and connected in parallel to each other, the method comprising:

providing alternating current for measurement of an impedance of the cell stack to the multiphase converter when operation of the multiphase converter is required; and controlling the multiphase converter to allow alternating current to sequentially flow through the first to $N^{th}$ current paths of the multiphase converter when measurement of an impedance of the cell stack is required, wherein the controlling the multiphase converter comprises controlling the multiphase converter so that the alternating current flows at each of the first to $N^{th}$ current paths during a predetermined time period.

8. The method according to claim 7, further comprising:

measuring alternating voltage applied to an input terminal of the multiphase converter and measuring the alternating current flowing through one of the first to $N^{th}$ current paths; and obtaining the impedance using the alternating current and the alternating voltage.

9. The method according to claim 8, wherein the controlling the multiphase converter includes:

applying the alternating current to an $n^{th}$, wherein $1 \le n \le N$ current path when measurement of the impedance is required;

applying the alternating current to current paths other than the $n^{th}$ current path when an alternating current application period during which the alternating current is applied to the $n^{th}$ current path is greater than or equal to an operation period threshold; and measuring the alternating voltage and the alternating current when the alternating current application period during which the alternating current is applied to the $n^{th}$ current path is less than the operation period threshold.

10. The method according to claim 9, wherein the operation period threshold is set in advance in accordance with durability of switching semiconductor devices located on the first to $N^{th}$ current paths in the multiphase converter.

11. The method of claim 7, further comprising:

outputting, by the multiphase converter, the alternating current provided from a main controller to one converter controller selected from among the first to $N^{th}$ converter controllers in response to an alternating current control signal, and generating, by the main controller, the alternating current control signal in response to a result of comparing an alternating current application period, during which the alternating current is applied to an $n^{th}$, where $1 \le n \le N$, converter controller, with an operation period threshold.

12. The method of claim 11, further comprising:

adding the alternating current as an output from the alternating current selector to reference current and outputting a result of the addition as a current control reference value;

subtracting current measured from the $n^{th}$ current path from the current control reference value;

proportionally integrating an output from the subtractor and output a result of proportional integration;

limiting a level of an output from the proportional integrator; and comparing an output from the limiter with reference voltage and output a result of comparison as an $n^{th}$ switching control signal.

* * * * *